(12) United States Patent
Kopecek et al.

(10) Patent No.: US 12,180,909 B2
(45) Date of Patent: Dec. 31, 2024

(54) SELF-DAMPING ACTUATOR

(71) Applicant: Woodward, Inc., Fort Collins, CO (US)

(72) Inventors: Joseph Thomas Kopecek, Santa Clarita, CA (US); William Muster, Park Ridge, IL (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 18/314,322

(22) Filed: May 9, 2023

(65) Prior Publication Data

US 2024/0167432 A1 May 23, 2024

Related U.S. Application Data

(62) Division of application No. 17/068,273, filed on Oct. 12, 2020, now Pat. No. 11,686,273.

(51) Int. Cl.
*F02K 1/76* (2006.01)
*F02K 1/72* (2006.01)

(52) U.S. Cl.
CPC ........... *F02K 1/763* (2013.01); *F02K 1/72* (2013.01); *F05D 2260/4031* (2013.01); *F05D 2260/406* (2013.01); *F05D 2260/602* (2013.01); *F05D 2260/605* (2013.01); *F05D 2260/901* (2013.01)

(58) Field of Classification Search
CPC ... F02K 1/76; F02K 1/763; F02K 1/72; F05D 2260/4031; F05D 2260/406; F05D 2260/602; F05D 2260/605; F05D 2260/90
See application file for complete search history.

(56) References Cited

U.S. PATENT DOCUMENTS 3,002,497 A * 10/1961 Gulick ............... F02K 1/76
91/452
4,391,409 A 7/1983 Scholz
5,609,020 A 3/1997 Jackson et al.
(Continued)

FOREIGN PATENT DOCUMENTS

CN 108884784 11/2018
EP 1398493 3/2004
EP 3333400 6/2018

OTHER PUBLICATIONS

Chinese Office Action in Chinese Application No. 201880023018, dated Jan. 19, 2020, with English translation, 9 pages.
(Continued)

*Primary Examiner* — Andrew H Nguyen
(74) *Attorney, Agent, or Firm* — Fish & Richardson P.C.

(57) ABSTRACT

The subject matter of this specification can be embodied in, among other things, an actuator apparatus includes an output member configured to actuate between a first positional configuration and a second positional configuration, a source fluid reservoir, a fluid velocity resistor configured to provide a predetermined resistance to fluid flow, a fluid velocity fuse configured to flow fluid flows having a first predetermined range of fluid velocities and to block fluid flows having second predetermined range of fluid velocities, and a fluid actuator assembly configured to urge fluid flow from the source fluid reservoir through the fluid velocity resistor and the fluid velocity fuse based on actuation of the output member.

10 Claims, 11 Drawing Sheets

(56) References Cited

U.S. PATENT DOCUMENTS

| | | |
|---|---|---|
| 8,904,751 B2 | 12/2014 | Howarth et al. |
| 9,109,536 B2 | 8/2015 | Willett et al. |
| 9,309,835 B2 | 4/2016 | Ko et al. |
| 10,288,007 B2 | 5/2019 | Kopecek |
| 11,686,273 B2 | 6/2023 | Kopecek et al. |
| 2004/0068977 A1 | 4/2004 | McKay |
| 2016/0039398 A1 | 2/2016 | Roll et al. |
| 2016/0159375 A1 | 6/2016 | Yamazaki et al. |
| 2018/0216573 A1* | 8/2018 | Kopecek ................. F02K 1/763 |
| 2018/0223738 A1 | 8/2018 | Greenberg et al. |
| 2020/0025142 A1 | 1/2020 | Kopecek |
| 2022/0112865 A1 | 4/2022 | Kopecek |

OTHER PUBLICATIONS

International Preliminary Report on Patentability in International Application No. PCT/US2018/015937, mailed on Aug. 6, 2019, 8 pages.
International Preliminary Report on Patentability in International Application No. PCT/US2021/054371, mailed on Apr. 27, 2023, 9 pages.
International Search Report and Written Opinion in International Application No. PCT/US/2021/054371, mailed on Feb. 1, 2022, 14 pages.
International Search Report and Written Opinion in International Application No. PCT/US2018/015937, mailed on May 15, 2018, 12 pages.
Communication Pursuant to Article 94(3) in European Application No. 21802506.0, dated Jun. 25, 2024, 5 pages.

\* cited by examiner

SELF-DAMPING ACTUATOR

CROSS-REFERENCE TO RELATED APPLICATIONS

This application is a divisional of U.S. patent Ser. No. 17/068,273, filed Oct. 20, 2020, now allowed, which is hereby incorporated by reference in its entirety.

TECHNICAL FIELD

This instant specification relates to an aircraft thrust reverser actuation system.

BACKGROUND

Thrust reversers are commonly incorporated in aircraft turbine engines. The role of the thrust reverser is to improve the braking capability of the aircraft upon landing by redirecting fluid flow through the engine to provide a counter-thrust opposing the direction of travel. As the thrust reverser is deployed, the forces that are being opposed act to aid in the deployment (e.g., as the reverser enters the airflow, the airflow urges the reverser toward its deployed position). In general, at the start of deployment, energy is needed to actuate the reverser, but during deployment the energy of the airflow can cause the actuator to generate, rather than consume, energy.

Many current and past aircraft implement hydraulic thrust reverser actuation systems (HTRAS). In some such systems, the additional hydraulic flow caused by aiding forces can place a large hydraulic flow demand on the aircraft hydraulic pump. To limit flow demand, regenerative-type directional control valves are often utilized. These directional control valves permit fluid flowing from the retract or "stow" chambers of the actuators to be recirculated to the actuator deploy chambers during deployment of the thrust reverser. The recirculation flow can be selectively implemented as an external aiding load is applied to the actuators during deployment.

More recently, in some applications, HTRAS have been replaced by electromechanical thrust reverser actuation systems (EMTRAS) in aircraft turbine engine applications. New reverser types such as the Hidden Blocker Door (HBD) and Sliding Cascade (SC) are also being used, however these new types of reversers produce much larger loads upon the actuation system than conventional cascade type reversers. The high aiding loads can create unacceptably large loads upon the gear trains of such actuators, and can produce unacceptably high amounts of regenerative electrical power from the back-driving of the actuator motors.

SUMMARY

In general, this document describes a thrust reverser actuation system.

In a general aspect, an actuator apparatus includes an output member configured to actuate between a first positional configuration and a second positional configuration, a source fluid reservoir, a fluid velocity resistor configured to provide a predetermined resistance to fluid flow, a fluid velocity fuse configured to flow fluid flows having a first predetermined range of fluid velocities and to block fluid flows having second predetermined range of fluid velocities, and a fluid actuator assembly configured to urge fluid flow from the source fluid reservoir through the fluid velocity resistor and the fluid velocity fuse based on actuation of the output member.

Various embodiments can include some, all, or none of the following features. The fluid velocity resistor can be connected in fluidic parallel with the fluid velocity fuse. The fluid actuator assembly can include a fluid piston assembly including a pressure chamber defined by the source fluid reservoir and a piston configured to vary a volume of the pressure chamber based on actuation of the output member. The actuator apparatus can also include a drain fluid reservoir, where the fluid velocity resistor and the fluid velocity fuse are connected in fluidic parallel between the pressure chamber and the drain fluid reservoir, and the fluid piston assembly is configured to urge fluid flow from the pressure chamber to the drain fluid reservoir through the fluid velocity resistor and the fluid velocity fuse. The drain fluid reservoir can include a fluid pressure assembly configured to urge fluid flow from the drain fluid reservoir to the source fluid reservoir. The fluid pressure assembly can include a fluid chamber defined by the drain fluid reservoir and another piston configured to energize an energy storage member in response to receiving fluid from the fluid actuator assembly, and to urge fluid flow toward the fluid actuator assembly based on energy recovered from the energy storage member. The fluid actuator assembly can include a fluid pump assembly configured to be driven by the output member. The fluid pump assembly can include a first fluid port in fluidic communication with a first side of the fluid velocity resistor and a first side of the fluid velocity fuse, a second fluid port in fluidic communication with a second side of the fluid velocity resistor and a second side of the fluid velocity fuse, a pump member configured to urge fluid flow from the first fluid port to the second fluid port, and to urge fluid flow from the second fluid port to the first fluid port through the fluid velocity resistor and the fluid velocity fuse. The actuator apparatus can also include an electromechanical actuator configured to actuate the output member.

In another general aspect, a method of controlling actuator velocity includes urging movement of an output member of an actuator at a first output member velocity, urging, by a fluid actuator assembly, based on movement of the output member at the first output member velocity, fluid flow at a first fluid flow velocity through a fluid velocity resistor configured to provide a predetermined resistance to fluid flow, urging, by the fluid actuator assembly, based on movement of the output member at the first output member velocity, fluid flow at a second fluid flow velocity through a fluid velocity fuse configured to flow fluid flows having a first predetermined range of fluid velocities and to block fluid flows having second predetermined range of fluid velocities, wherein the second fluid flow velocity is within the first predetermined range of fluid velocities, permitting, by the fluid velocity fuse, fluid flow through the fluid velocity fuse based on the second fluid flow velocity being within the first predetermined range of fluid velocities, urging movement of the output member at a second output member velocity, different from the first output member velocity, urging, by a fluid actuator assembly, based on movement of the output member at the second output member velocity, fluid flow at a third fluid flow velocity through the fluid velocity resistor, and urging, by the fluid actuator assembly, based on movement of the output member at the second output member velocity, fluid flow at a fourth fluid flow velocity through the fluid velocity fuse, wherein the fourth fluid flow velocity is different from the second fluid flow velocity, and wherein the fourth fluid flow velocity is within the second predetermined range of fluid velocities, and blocking, by the fluid velocity fuse, fluid flow through the fluid velocity fuse based on the fourth fluid flow velocity being within the second predetermined range of fluid velocities.

Various implementations can include some, all, or none of the following features. The method can also include resisting movement of the output member at a first level of resistance based on the first fluid flow velocity and the second fluid flow velocity, and resisting movement of the output member at a second level of resistance based on the third fluid flow velocity and based on the blocking of fluid flow by the fluid velocity fuse. The fluid velocity resistor can be connected in fluidic parallel with the fluid velocity fuse. The fluid actuator assembly can include a fluid piston assembly having a pressure chamber defined by a source fluid reservoir and a piston configured to vary a volume of the pressure chamber based on actuation of the output member, urging, by the fluid actuator assembly, based on movement of the output member at the first output member velocity, fluid flow at the first fluid flow velocity through the fluid velocity resistor configured to provide the predetermined resistance to fluid flow also includes reducing the volume of the pressure chamber, based on movement of the output member at the first output member velocity and urging fluid flow out of the pressure chamber at a first outflow rate, and urging, by the fluid actuator assembly, based on movement of the output member at the second output member velocity, fluid flow at the fourth fluid flow velocity through the fluid velocity fuse, where the fourth fluid flow velocity is different from the second fluid flow velocity, and where the fourth fluid flow velocity is within the second predetermined range of fluid velocities also includes reducing the volume of the pressure chamber, based on movement of the output member at the second output member velocity and urging fluid flow out of the pressure chamber at a second outflow rate that is different from the first outflow rate. The method can also include urging fluid flow to a drain fluid reservoir, wherein the fluid velocity resistor and the fluid velocity fuse are connected in fluidic parallel between the pressure chamber and the drain fluid reservoir, and the fluid piston assembly is configured to urge fluid flow from the pressure chamber to the drain fluid reservoir through the fluid velocity resistor and the fluid velocity fuse. The method can also include urging, by a fluid pressure assembly of the pressure chamber, fluid flow from the drain fluid reservoir to the source fluid reservoir. The method can also include energizing an energy storage member based on fluid flow to the drain fluid reservoir, and wherein urging, by the fluid pressure assembly of the pressure chamber, fluid flow from the drain fluid reservoir to the source fluid reservoir can include urge fluid flow toward the fluid actuator assembly based on energy recovered from the energy storage member. The method can also include pumping, by a fluid pump assembly of the fluid actuator assembly and configured to be driven by the output member, fluid at a first pump output velocity based on movement of the output member at the first output member velocity, wherein the first fluid flow velocity and the second fluid flow velocity are based on the first pump output velocity, and pumping, by the fluid pump assembly, fluid at a second pump output velocity different from the first pump output velocity based on movement of the output member at the second output member velocity, wherein the third fluid flow velocity and the fourth fluid flow velocity are based on the second pump output velocity. The method can also include urging, by a pump member of the fluid pump assembly, fluid from a first fluid port in fluidic communication with a first side of the fluid velocity resistor and a first side of the fluid velocity fuse, to a second fluid port in fluidic communication with a second side of the fluid velocity resistor and a second side of the fluid velocity fuse, and urging, by the pump member, fluid flow from the second fluid port to the first fluid port through the fluid velocity resistor and the fluid velocity fuse. The method can also include applying electric power to an electromechanical actuator configured to urge movement of the output member.

In another example aspect, a turbofan engine system includes a turbofan engine, a nacelle surrounding the turbofan engine and defining an annular bypass duct through the turbofan engine to define a generally forward-to-aft bypass air flow path, a thrust reverser having at least one output member, movable to and from a reversing position where at least a portion of bypass air flow is reversed, an actuator coupled to the at least one output member to move the at least one output member into and out of the reversing position, a source fluid reservoir, a fluid velocity resistor configured to provide a predetermined resistance to fluid flow, a fluid velocity fuse configured to flow fluid flows having a first predetermined range of fluid velocities and to block fluid flows having second predetermined range of fluid velocities, and a fluid actuator assembly configured to urge fluid flow from the source fluid reservoir through the fluid velocity resistor and the fluid velocity fuse based on actuation of the output member.

The systems and techniques described here may provide one or more of the following advantages. First, a system can reduce or eliminate electrical resistor banks used to dissipate electrical energy that is regenerated when the system is under high tension load. Second, the system can improve the reliability or mean time between failure (MTBF) of the system by reducing or eliminating electrical resistor banks and the potential failure points associated with them. Third, the system can provide a damping apparatus with reduced weight by reducing or eliminating electrical resistor banks and the weight associated with them. Fourth, the system can reduce the amount of space or operational envelope used to provide damping functions by reducing the space needed for resistor banks. Fifth, the system can provide improved operator safety by reducing or eliminating resistor banks that can become hot after usage and must be allowed to cool before maintenance can be safely performed on the reverser.

The details of one or more implementations are set forth in the accompanying drawings and the description below. Other features and advantages will be apparent from the description and drawings, and from the claims.

DETAILED DESCRIPTION

This document describes thrust reverser actuation systems (TRAS). In most thrust reverser actuation systems, the external load imposed by the reverser during deployment upon the TRAS changes from compression to tension after an initial push-off load in compression. The tension load can become very high with advanced technology thrust reversers. In a conventional electromechanical TRAS (EMTRAS), the force-times-distance energy of the aiding load is first imposed upon the actuator gear train which in turn back-drives the electric motor. The motor must then dissipate this energy as heat through a bank of resistors.

With advanced technology thrust reversers the aiding loads will result in large loads transmitted through the gear teeth. This loading will necessitate commensurate upsizing of the gear teeth and other components to ensure adequate performance over life. This will have unacceptable size and weight consequences for the EMTRAS. The aiding load causes the EMTRAS electric motor to act as a generator (regenerative power). This regenerative power must be dissipated as heat in a bank of electrical resistors. The large amperages applied to the resistors result in low reliability for the affected resistors. In general, the systems and techniques described in this document reduce gear loading and the regenerative power of aiding forces to reasonable levels, by providing hydraulic damping in the actuator to reduce loads upon the gear train and electric motor.

Figure 1:
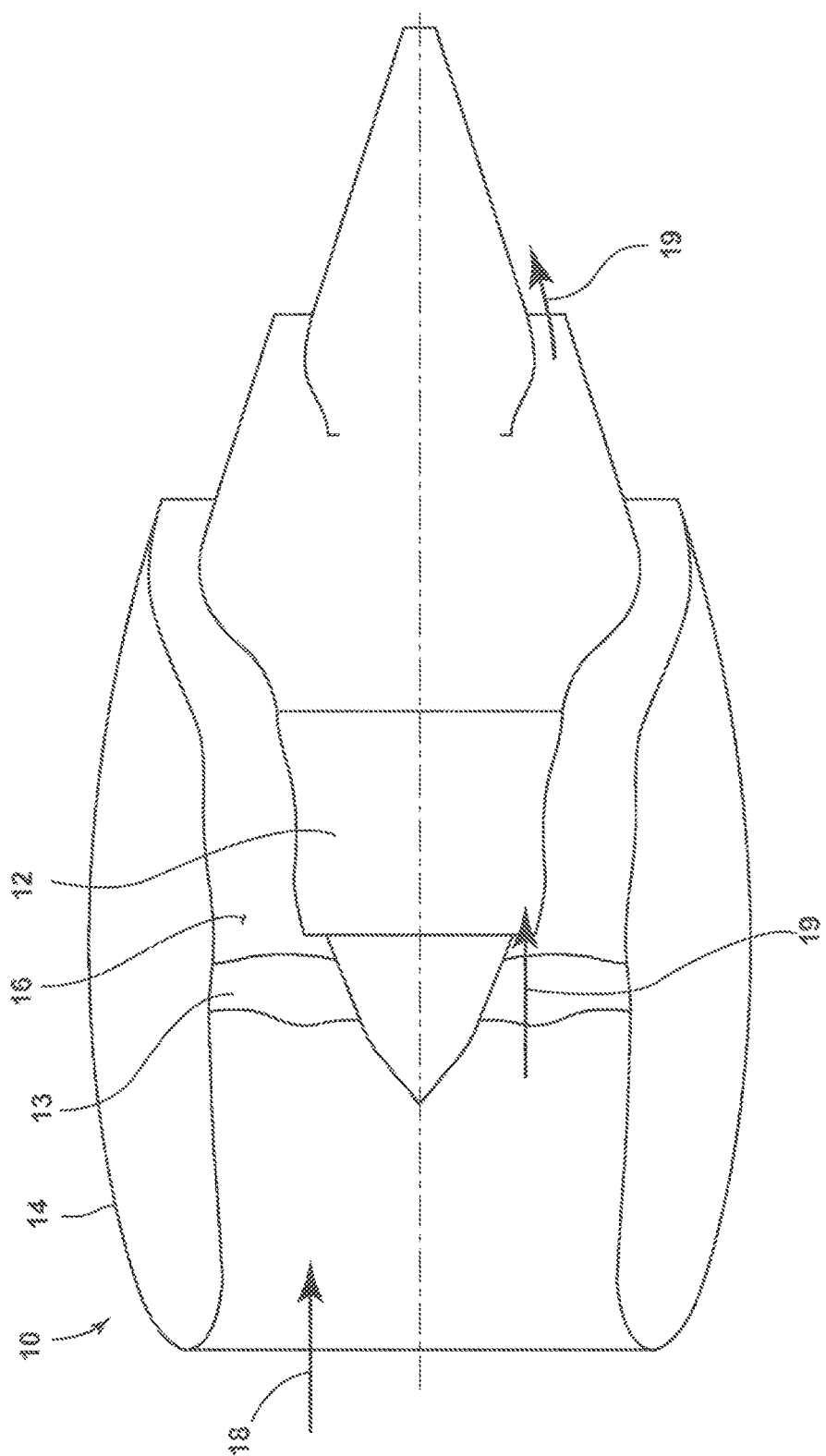
FIG. 1 is a schematic view of an example turbofan jet engine system with a portion of the outer nacelle cut away for clarity.

FIG. 1 is a schematic view of an example turbofan jet engine system. FIG. 1 illustrates an example turbofan jet engine assembly 10 having a turbine engine 12, a fan assembly 13, and a nacelle 14. Portions of the nacelle 14 have been cut away for clarity. The nacelle 14 surrounds the turbine engine 12 and defines an annular airflow path or annular bypass duct 16 through the jet engine assembly 10 to define a generally forward-to-aft bypass airflow path for bypass air flow as schematically illustrated by the arrow 18. A combustion airflow is schematically illustrated by the arrows 19.

Figure 2:
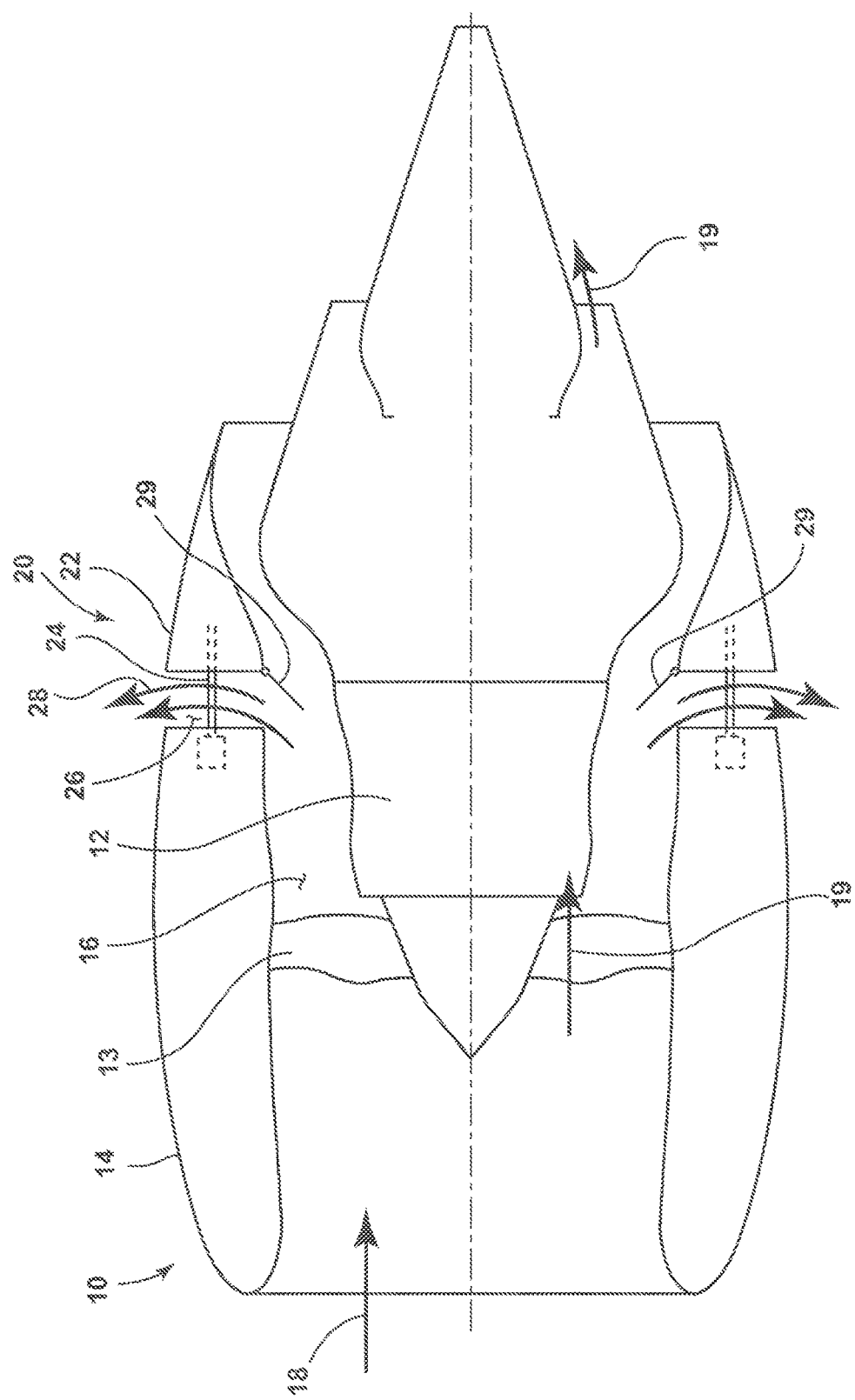
FIG. 2 is a schematic view of the engine of FIG. 1 with an exemplary thrust reverser.

A thrust reverser with at least one movable element, which is movable to and from a reversing position, may be used to change the direction of the bypass airflow. In the reversing position, the movable element may be configured to reverse at least a portion of the bypass airflow. There are several methods of obtaining reverse thrust on turbofan jet engine assemblies. FIG. 2 schematically illustrates one example of a thrust reverser 20 that may be used in the turbofan jet engine assembly 10. The thrust reverser 20 includes a movable element 22. The movable element 22 has been illustrated as a cowl portion that is capable of axial motion with respect to the forward portion of the nacelle 14. An electromechanical actuator 24 may be coupled to the movable element 22 to move the movable element 22 into and out of the reversing position. In the reversing position, as illustrated, the movable element 22 limits the annular bypass area between the movable element 22 and the turbine engine 12, it also opens up a portion 26 between the movable element 22 and the forward portion of the nacelle 14 such that the air flow path may be reversed as illustrated by the arrows 28. An optional deflector or flap 29 may be included to aid in directing the airflow path between the movable element 22 and the forward portion of the nacelle 14.

Figure 3:
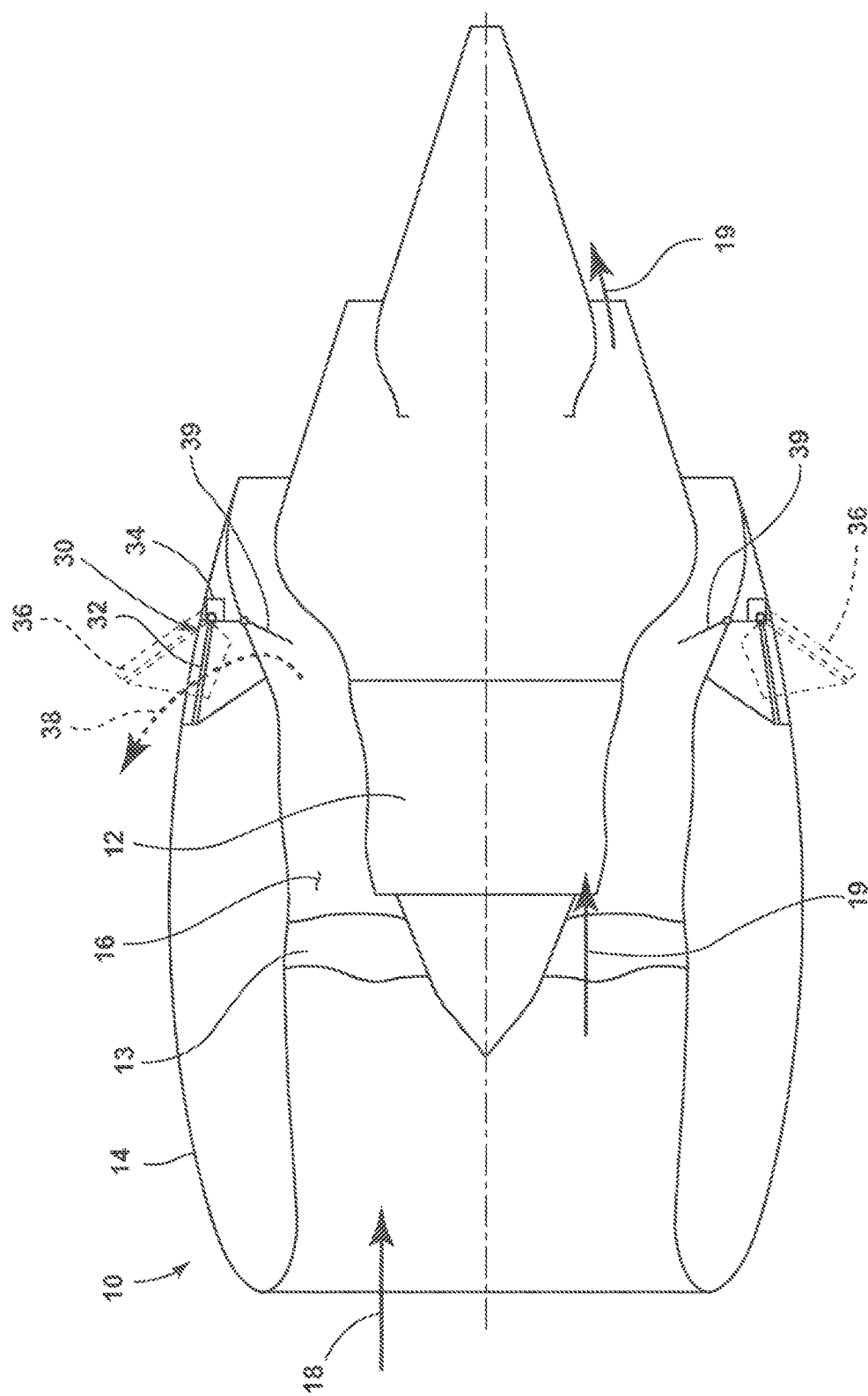
FIG. 3 is a schematic view of the engine of FIG. 1 with an alternative exemplary thrust reverser.

FIG. 3 schematically illustrates an alternative example of a thrust reverser 30. The thrust reverser 30 includes a movable element 32. The movable element 32 has been illustrated as a deflector, which may be built into a portion of the nacelle 14. An electromechanical actuator 34 may be coupled to the movable element 32 to move the movable element 32 into and out of the reversing position. In the reversing position, shown in phantom and indicated at 36, the movable element 32 turns that air outward and forward to reverse its direction as illustrated by the arrows 38. An optional deflector or flap 39 may be included to aid in directing the airflow path outward.

In both illustrative examples, the thrust reverser changes the direction of the thrust force. Both the thrust reverser 20 and the thrust reverser 30 have been described as electrically operated systems and an electromechanical actuator has been schematically illustrated. In some embodiments, the thrust reverser 20 and/or the thrust reverser 30 can be powered by fluids (e.g., hydraulic, pneumatic) or by any other appropriate power source or actuator type.

Figure 4A:
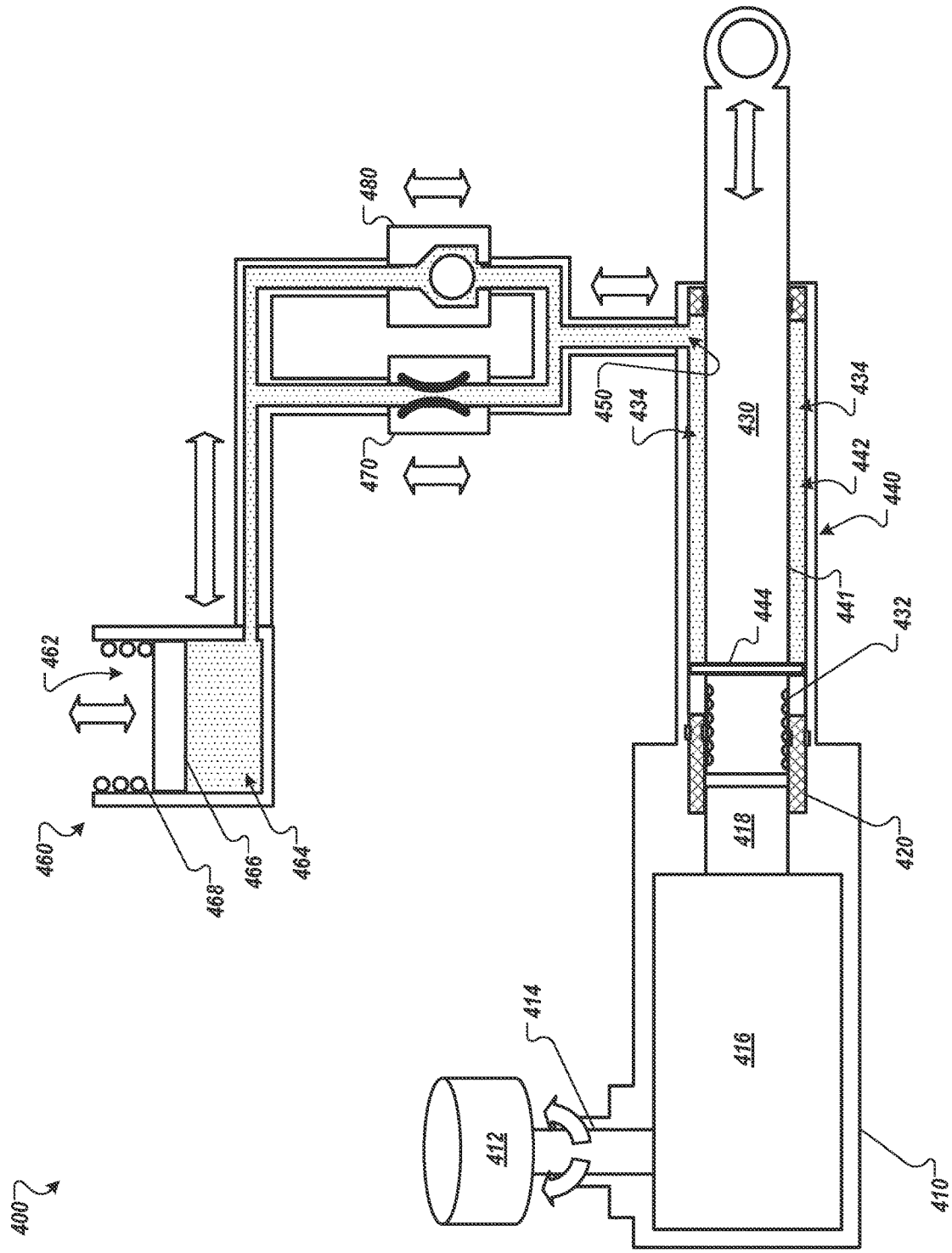
FIGS. 4A and 4B are cross-sectional views of an example thrust reverser system with velocity control.
Figure 4B:
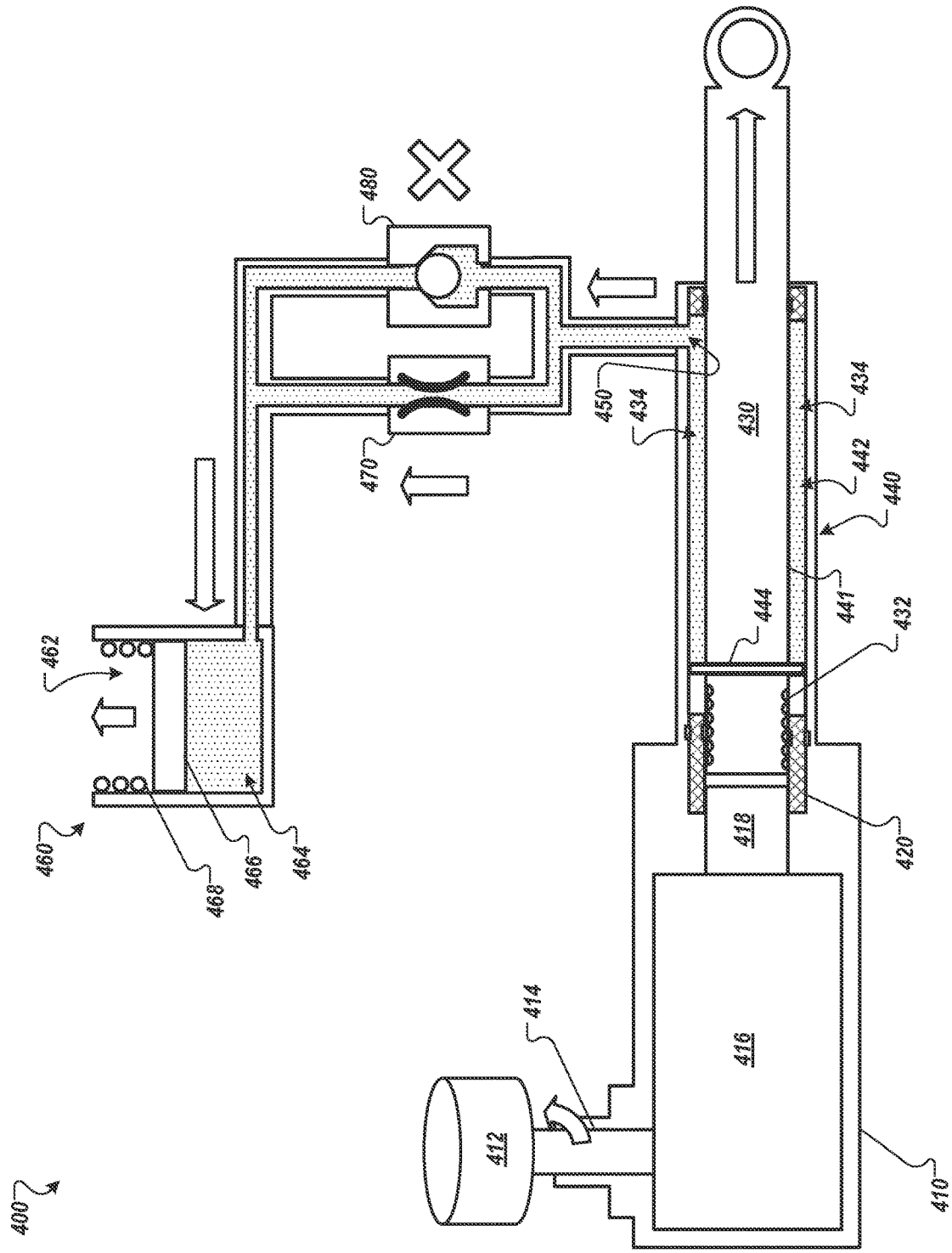

FIGS. 4A and 4B are cross-sectional views of an example thrust reverser system (TRAS) 400 with velocity control. The TRAS 400 is an actuator apparatus that includes a linear actuator 410 that is driven by an electromechanical power source, and an electric motor 412. As such, the TRAS 400 is an electromechanical TRAS (EMTRAS). In some embodiments, the linear actuator 410 can be the electromechanical actuator 24 of FIG. 2 or the electromechanical actuator 34 of FIG. 3.

The linear actuator 410 is driven by the electric motor 412 through a synchronization shaft 414. A gearbox 416 transforms rotation of the synchronization shaft 414 to rotation of an output member 418 and a nut 420. In some embodiments, the electric motor 412 can be integrated with the linear actuator 410 to drive rotation of the nut 420.

The linear actuator 410 includes an output member 430 configured to actuate between a first positional configuration and a second positional configuration. The output member 430 includes a leadscrew 432 configured to be driven linearly by rotation of the nut 420. As the nut 420 is rotated clockwise and counter-clockwise, the output member 430 extends (e.g., toward a deployed configuration of the TRAS 400) and retracts (e.g., toward a retracted or stowed configuration of the TRAS 400).

The linear actuator 410 includes a fluid actuator assembly 440. The fluid actuator assembly 440 includes a source fluid reservoir 434 and a fluid piston assembly 441. The fluid actuator assembly 440 has a pressure chamber 442 defined by the source fluid reservoir 434, and the fluid piston assembly 441 includes a piston 444 configured to vary a volume of the pressure chamber 442 based on actuation of the output member 430. The piston 444 is affixed to and configured to be driven by the output member 430, and linear movement of the output member 430 varies the volume of the source fluid reservoir 434. As the volume of the source fluid reservoir 434 varies, fluid (e.g., hydraulic fluid) is urged bidirectionally through a fluid port 450. The fluid velocity at which the fluid flows through the fluid port 450 is variable and proportional to the linear velocity of movement of the output member 430.

The source fluid reservoir 434 is in fluid communication with a drain fluid reservoir 460 through a fluid velocity resistor 470 configured to provide a predetermined resistance to fluid flow, and a fluid velocity fuse 480. The fluid velocity resistor 470 and the fluid velocity fuse 480 are connected in fluidic parallel between the pressure chamber 442 and the drain fluid reservoir 460.

The fluid velocity fuse 480 is configured to flow fluid flows having a first predetermined range of fluid velocities and to block fluid flows having second predetermined range of fluid velocities. For example, when fluid flows through the fluid velocity fuse 480 from the source fluid reservoir 434 toward the drain fluid reservoir 460 at or below a predetermined fluid velocity threshold, the flow is permitted. However, when the fluid flow through the fluid velocity fuse 480 toward the drain fluid reservoir 460 exceeds the predetermined fluid velocity threshold, the fluid velocity fuse 480 will shut and block flow until the velocity drops below the predetermined velocity threshold again. Fluid flow through the fluid velocity fuse 480 in the opposite direction is substantially unaffected regardless of velocity.

In the example of FIG. 4A, the TRAS 400 is shown in a configuration in which the fluid velocity fuse 480 is open (e.g., untriggered). In some implementations, this configuration can exist when the output member 430 is extending at a velocity that is at or below a predetermined threshold velocity, or is retracting. For example, the illustrated configuration of FIG. 4A can represent the configuration of the TRAS 400 during early stages of thrust reverser deployment, when the linear actuator 410 provides most or all of the power needed to deploy the thrust reverser (e.g., before engine thrust catches the thrust reverser and provides additional power that can increase the rate of deployment).

As the output member 430 extends, the fluid piston assembly 441 urges fluid flow from the pressure chamber 442 to the drain fluid reservoir 460 through the fluid velocity resistor 470 and the fluid velocity fuse 480. The drain fluid reservoir 460 includes a fluid pressure assembly 462 configured to urge fluid flow from the drain fluid reservoir 460 to the source fluid reservoir 434.

The fluid pressure assembly 462 includes a fluid chamber 464 defined by the drain fluid reservoir 460 and a piston 466 configured to energize an energy storage member 468 in response to receiving fluid from the fluid actuator assembly 440, and to urge fluid flow toward the fluid actuator assembly 440 based on energy recovered from the energy storage member 468. As fluid enters the fluid chamber 464, the piston 466 moves. In the illustrated example, the energy storage member 468 is a spring or another type of compliant member that can be distorted (e.g., compressed) by movement of the piston 466. When incoming fluid pressure drops, the spring can return toward its undistorted shape, urging movement of the piston 466 and return flow of the fluid.

In some embodiments, the fluid pressure assembly 462 can have any other appropriate configuration that can provide return flow of the fluid. For example, the fluid pressure assembly 462 can be an elastic bladder that can be inflated by inflow and cause outflow upon deflation. In another example, the fluid pressure assembly 462 can include a volume of compressible fluid (e.g., air) that can be compressed by inflow of the incompressible fluid and cause outflow upon decompression. In another example, the fluid pressure assembly 462 can be a chamber positioned at an elevated level relative to the source fluid reservoir 434 (e.g., fluid can be urged upward relative to gravity, and then be gravity-fed back to the source). In some embodiments, the fluid pressure assembly 462 can include an electric or mechanical pump configured to urge return flow.

In the example of FIG. 4B, the TRAS 400 is shown in a configuration in which the fluid velocity fuse 480 is closed (e.g., shut, triggered). In some implementations, this configuration can exist when the output member 430 is extending at a velocity that exceeds the predetermined threshold velocity. For example, the illustrated configuration of FIG. 4B can represent the configuration of the TRAS 400 during later stages of thrust reverser deployment, when reversed thrust causes the thrust reverser to pull on the output member 430, causing a sudden increase the velocity of extension of the output member 430 and an increase in the rate of deployment of the thrust reverser.

In the illustrated configuration, since the fluid velocity fuse 480 is closed, substantially all flow of fluid from the source fluid reservoir 434 toward the drain fluid reservoir 460 is directed through the fluid velocity resistor 470. The fluid velocity resistor 470 reduces the velocity of the flow, which in turn reduces the velocity at which fluid is able to exit the source fluid reservoir 434, which in turn reduces the velocity at which the output member 430 can move.

Figure 5:
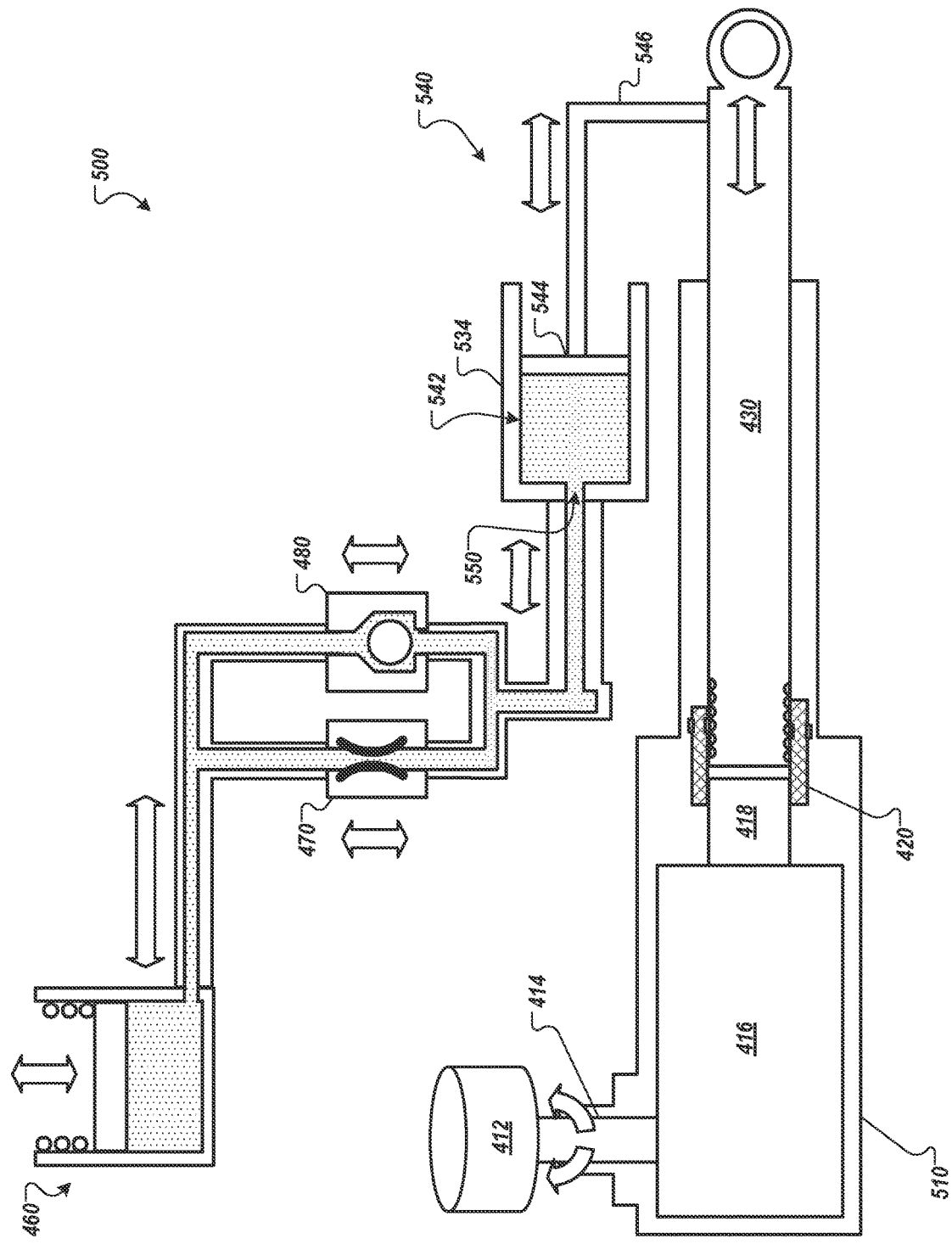
FIG. 5 is a cross-sectional view of another example thrust reverser system with velocity control.

FIG. 5 is a cross-sectional view of another example thrust reverser system (TRAS) 500 with velocity control. The TRAS 500 is an actuator apparatus that includes a linear actuator 510 that is driven by the electric motor 412. As such, the TRAS 500 is an electromechanical TRAS (EMTRAS). In some embodiments, the linear actuator 510 can be the electromechanical actuator 24 of FIG. 2 or the electromechanical actuator 34 of FIG. 3.

The linear actuator 510 is driven by the electric motor 412 through the synchronization shaft 414. The gearbox 416 transforms rotation of the synchronization shaft 414 to rotation of the output member 418 and the nut 420. In some embodiments, the electric motor 412 can be integrated with the linear actuator 510 to drive rotation of the nut 420. The linear actuator 510 includes the output member 430 configured to actuate between a first positional configuration and a second positional configuration.

The linear actuator 510 includes a piston assembly 540 having a pressure chamber 542 that defines a source fluid reservoir 534, and has a piston 544 that is configured to be mechanically actuated based on movement of the output member 430. As the output member 430 moves, the piston 544 moves to vary a volume of the pressure chamber 542. The piston 544 is affixed to the output member 430 by a linkage 546 and is configured to be driven by the output member 430, and linear movement of the output member 430 varies the volume of the source fluid reservoir 534. As the volume of the source fluid reservoir 534 varies, fluid (e.g., hydraulic fluid) is urged bidirectionally through a fluid port 550. The fluid velocity at which the fluid flows through the fluid port 550 is variable and proportional to the linear velocity of movement of the output member 430.

The source fluid reservoir 534 is in fluid communication with the drain fluid reservoir 460 through the fluid velocity resistor 470 and the fluid velocity fuse 480. The fluid velocity resistor 470 and the fluid velocity fuse 480 are connected in fluidic parallel between the pressure chamber 542 and the drain fluid reservoir 460.

As the output member 430 extends and retracts, the piston assembly 540 urges fluid flow between the pressure chamber 542 to the drain fluid reservoir 460 through the fluid velocity resistor 470 and the fluid velocity fuse 480. As in the examples shown in FIGS. 4A and 4B, the fluid velocity fuse 480 is configured to close when fluid flow toward the drain fluid reservoir 460 exceeds a predetermined fluid velocity. When fluid velocity is limited, the velocity at which the piston 544 and the output member 430 move are also limited.

Figure 6:
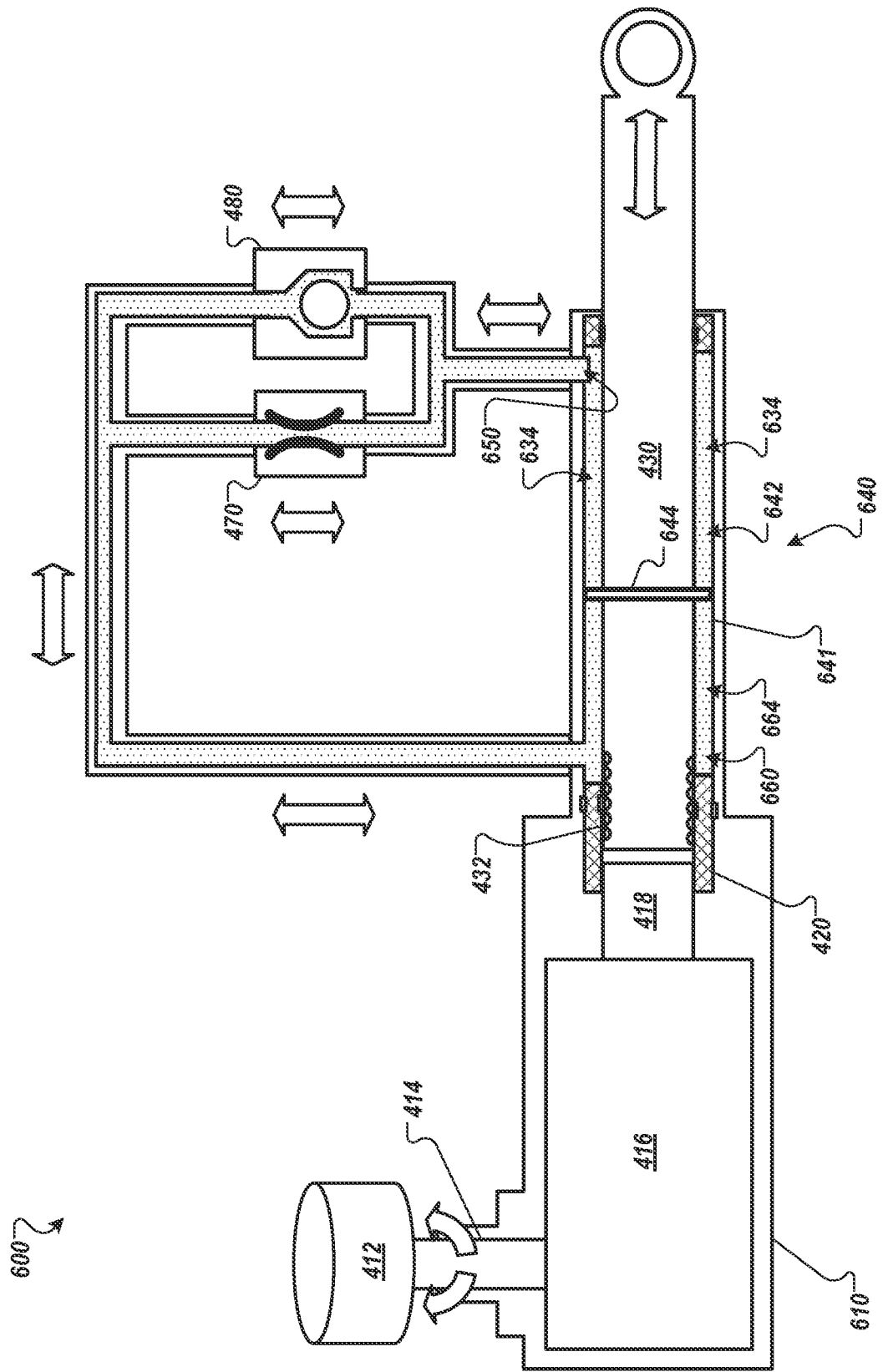
FIG. 6 is a cross-sectional view of another example thrust reverser system with velocity control.

FIG. 6 is a cross-sectional view of another example thrust reverser system (TRAS) 600 with velocity control. The TRAS 600 is an actuator apparatus that includes a linear actuator 610 that is driven by the electric motor 412. As such, the TRAS 600 is an electromechanical TRAS (EMTRAS). In some embodiments, the linear actuator 610 can be the electromechanical actuator 24 of FIG. 2 or the electromechanical actuator 34 of FIG. 3.

The linear actuator 610 is driven by the electric motor 412 through the synchronization shaft 414. The gearbox 416 transforms rotation of the synchronization shaft 414 to rotation of the output member 418 and the nut 420. In some embodiments, the electric motor 412 can be integrated with the linear actuator 610 to drive rotation of the nut 420. The linear actuator 610 includes the output member 430 configured to actuate between a first positional configuration and a second positional configuration.

The linear actuator 610 includes a fluid actuator assembly 640. The fluid actuator assembly 640 includes a source fluid reservoir 634, a drain fluid reservoir 660, and a fluid piston assembly 641. The fluid actuator assembly 640 has a pressure chamber 642 and a pressure chamber 664 defined by the source fluid reservoir 634, and the fluid piston assembly 641 includes a piston 644 configured to vary a volume of the pressure chamber 642 based on actuation of the output member 430. The piston 644 is also configured to vary the volume of the pressure chamber 664 inversely relative to the volume of the pressure chamber 642 as the output member 430 moves. The piston 644 is affixed to and configured to be driven by the output member 430, and linear movement of the output member 430 varies the volume of the source fluid reservoir 634 and the drain fluid reservoir 660. As the volume of the source fluid reservoir 634 and the drain fluid reservoir 660 vary, fluid (e.g., hydraulic fluid) is urged bidirectionally through a fluid port 650. The fluid velocity at which the fluid flows through the fluid port 650 is variable and proportional to the linear velocity of movement of the output member 430.

The source fluid reservoir 634 is in fluid communication with the drain fluid reservoir 660 through the fluid velocity resistor 470 and the fluid velocity fuse 480. The fluid velocity resistor 470 and the fluid velocity fuse 480 are connected in fluidic parallel between the pressure chamber 642 and the drain fluid reservoir 660.

As the output member 430 extends and retracts, the piston assembly 640 urges fluid flow between the pressure chamber 642 to the drain fluid reservoir 660 through the fluid velocity resistor 470 and the fluid velocity fuse 480. The fluid velocity fuse 480 is configured to close when fluid flow toward the drain fluid reservoir 660 exceeds a predetermined fluid velocity. When fluid velocity is limited, the velocity at which the piston 644 and the output member 430 move are also limited.

Figure 7A:
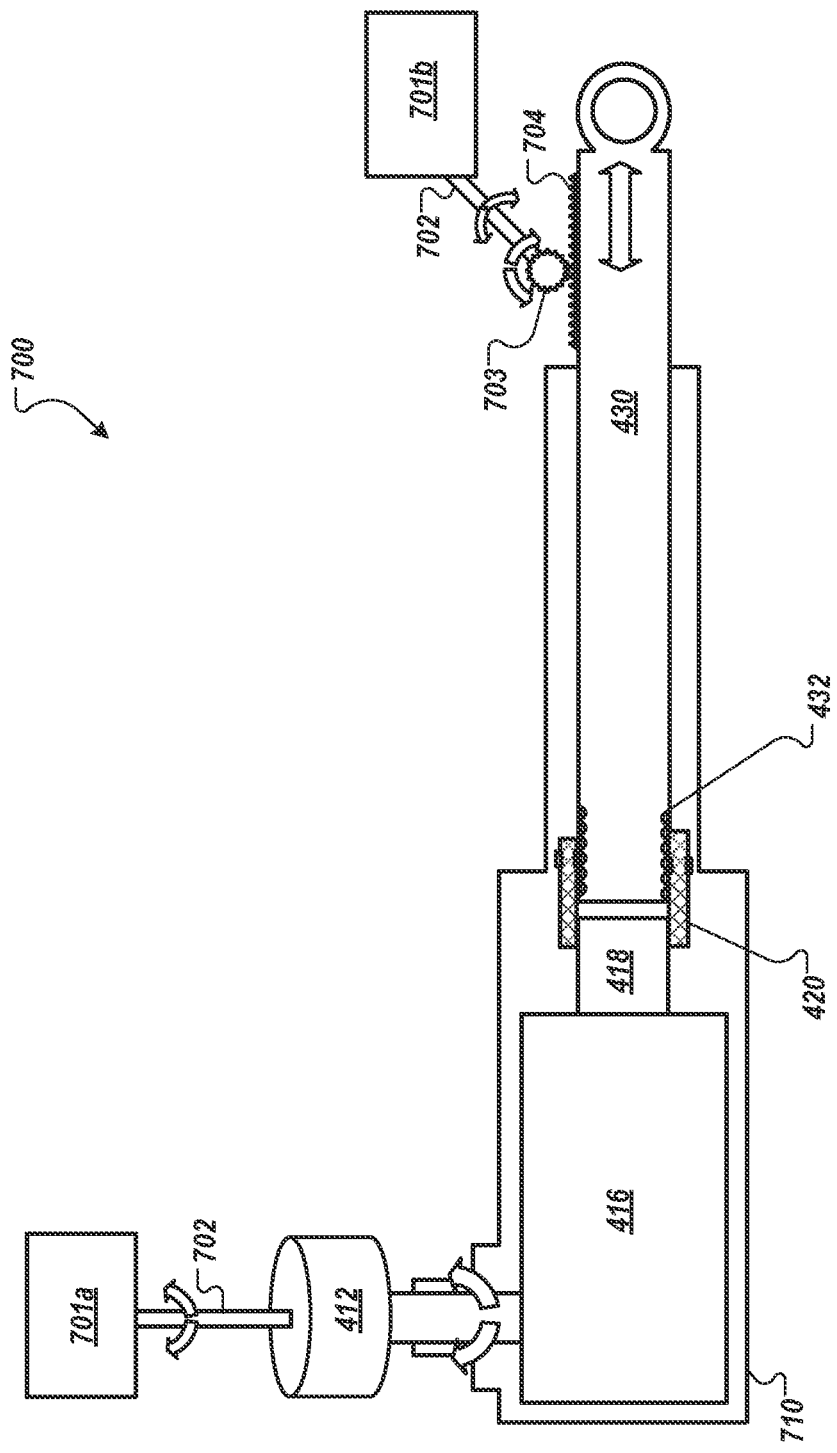
FIG. 7A is a cross-sectional view of another example thrust reverser system with velocity control.

FIG. 7A is a cross-sectional view of another example thrust reverser system (TRAS) 700 with velocity control. The TRAS 700 is an actuator apparatus that includes a linear actuator 710 that is driven by the electric motor 412. As such, the TRAS 700 is an electromechanical TRAS (EMTRAS). In some embodiments, the linear actuator 710 can be the electromechanical actuator 24 of FIG. 2 or the electromechanical actuator 34 of FIG. 3.

The linear actuator 710 is driven by the electric motor 412 through the synchronization shaft 414. The gearbox 416 transforms rotation of the synchronization shaft 414 to rotation of the output member 418 and the nut 420. In some embodiments, the electric motor 412 can be integrated with the linear actuator 510 to drive rotation of the nut 420. The linear actuator 510 includes the output member 430 configured to actuate between a first positional configuration and a second positional configuration.

The TRAS 700 includes a fluid velocity controller 701a and a fluid velocity controller 701b. In some embodiments, the TRAS 700 may include one or both of the fluid velocity controllers 701a and 701b. The fluid velocity controllers 701a and 701b include a drive shaft 702 that is configured to be rotated, directly or indirectly, by the linear actuator 710. In the illustrated example, the fluid velocity controller 701a is driven by rotation of the motor 412 (e.g., back-driven by motion of the output member 430), and the fluid velocity controller 701b is driven by a pinion gear 703 that is rotated by linear movement of a corresponding rack gear 704 that is affixed to the output member 430. In some embodiments, one or both of the fluid velocity controllers 701a and 701b can be driven by the linear actuator 710 in other ways. For example, one or both of the fluid velocity controllers 701a and 701b can be directly coupled to the motor 412, or can be coupled to the synchronization shaft 414. In another example, one or both of the fluid velocity controllers 701a and 701b can be magnetically coupled to a moveable or rotatable member of the TRAS 700.

Figure 7B:
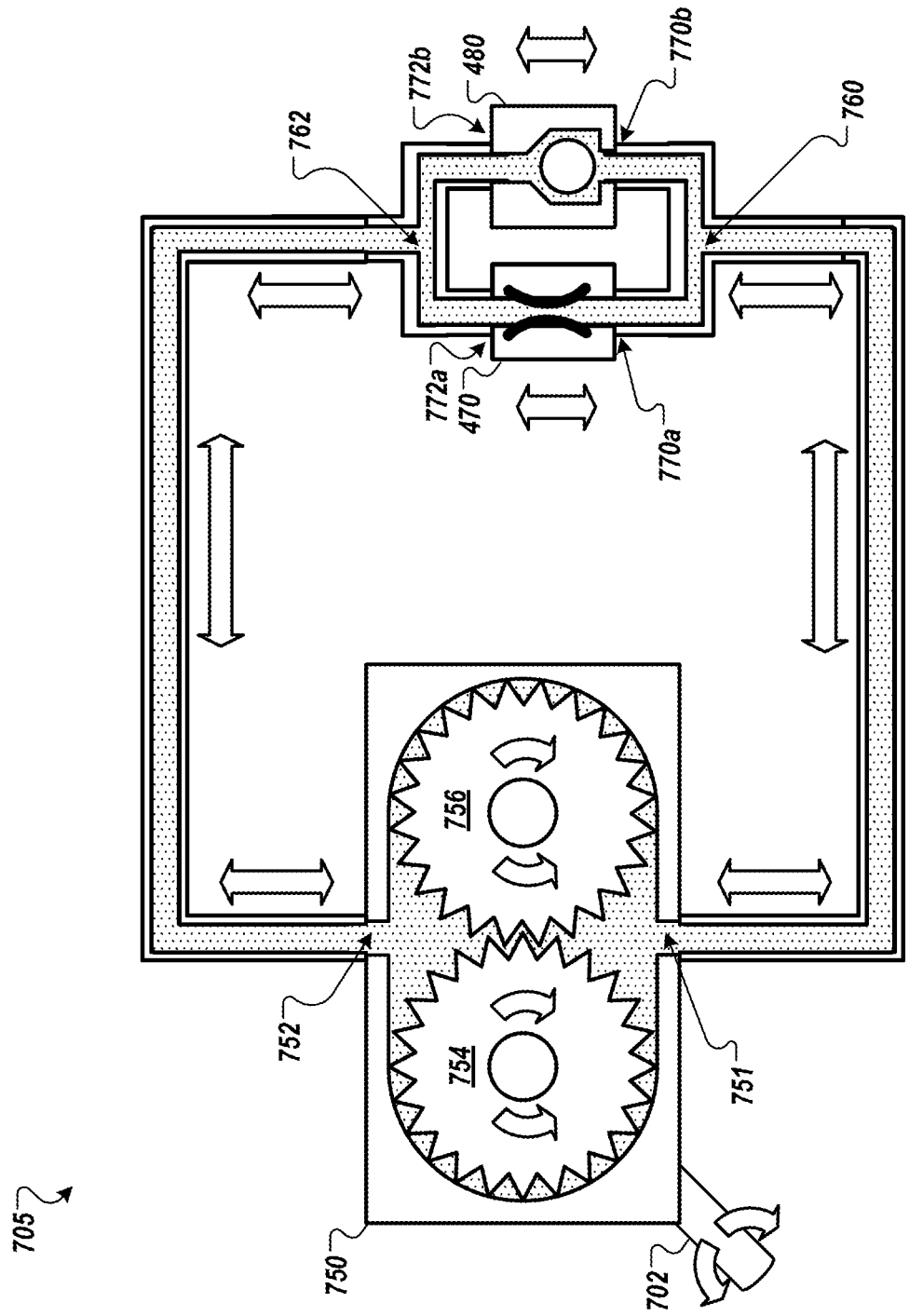
FIGS. 7B and 7C are cross-sectional views of another example thrust reverser velocity controller.

FIGS. 7A and 7B are cross-sectional views of an example thrust reverser velocity controller 705. In some embodiments, the thrust reverser velocity controller 705 can be used as one or both of the example fluid velocity controller 701a and the example fluid velocity controller 701b. The velocity controller 705 includes the fluid velocity resistor 470 and the fluid velocity fuse 480 of FIGS. 4A-6. The fluid velocity resistor 470 and the fluid velocity fuse 480 are connected in parallel between a fluid port 760 and a fluid port 762.

The thrust reverser velocity controller 705 also includes a fluid pump assembly 750 (e.g., a pump member). The fluid pump assembly 750 includes the drive shaft 702 that is configured to be rotated to urge rotation of one or both of a pump gear 754 and a pump gear 756. The drive shaft 702 is configured to be driven, directly or indirectly, by an output member of a TRAS (e.g., the output member 430 or the synchronization shaft 414).

The fluid pump assembly 750 includes a fluid port 751 in fluidic communication with the fluid port 760. As such, the fluid port 751 is in fluid communication with a first side 770a of the fluid velocity resistor 470 and a first side 770b of the fluid velocity fuse 480. The fluid pump assembly 750 also includes a fluid port 752 in fluidic communication with the fluid port 762. As such, the fluid port 752 is in fluid communication with a second side 772a of the fluid velocity resistor 470 and a second side 772b of the fluid velocity fuse 480. The fluid pump assembly 750 is configured to urge fluid flow from the fluid port 751 to the fluid port 752, and to urge fluid flow from the fluid port 752 to the fluid port 751 through the fluid velocity resistor 470 and the fluid velocity fuse 480.

In the example of FIG. 7B, the thrust reverser velocity controller 705 is shown in a configuration in which the fluid velocity fuse 480 is open (e.g., untriggered). In some implementations, this configuration can exist when the output member 430 is extending at a velocity that is at or below a predetermined threshold velocity, or is retracting. For example, the illustrated configuration of FIG. 7B can represent the configuration of the TRAS 700 during early stages of thrust reverser deployment, when the linear actuator 410 provides most or all of the power needed to deploy the thrust reverser (e.g., before engine thrust catches the thrust reverser and provides additional power that can increase the rate of deployment).

Figure 7C:
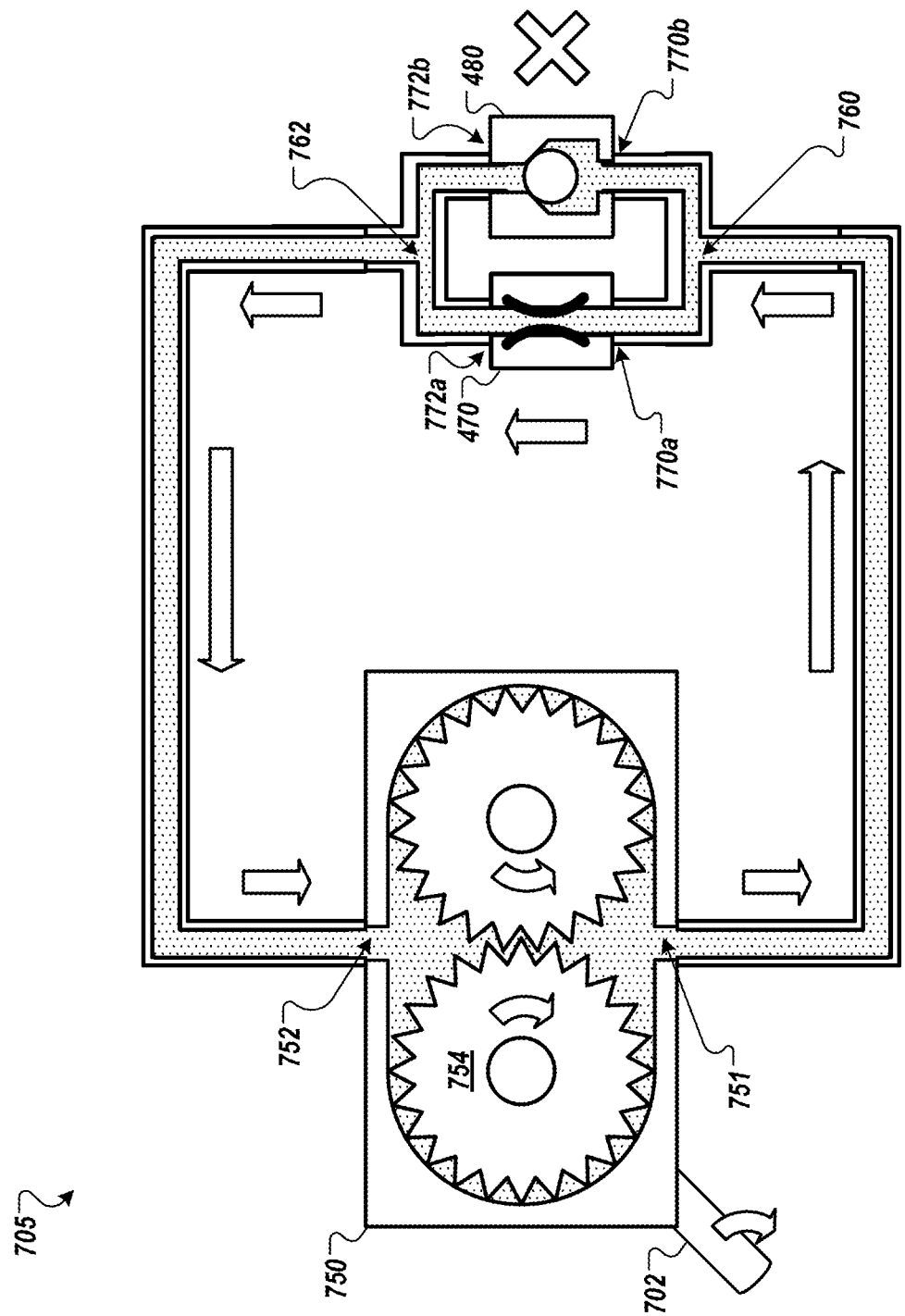

FIG. 7C shows the thrust reverser velocity controller 705 in a configuration in which the fluid velocity fuse 480 is closed (e.g., triggered, tripped). In some implementations, this configuration can exist when the output member 430 is extending at a velocity that exceeds the predetermined threshold velocity. For example, the illustrated configuration of FIG. 7C can represent the configuration of the TRAS 700 during later stages of thrust reverser deployment, when engine thrust catches the thrust reverser and provides additional power that can increase the rate of deployment the linear actuator 410.

Figure 8:
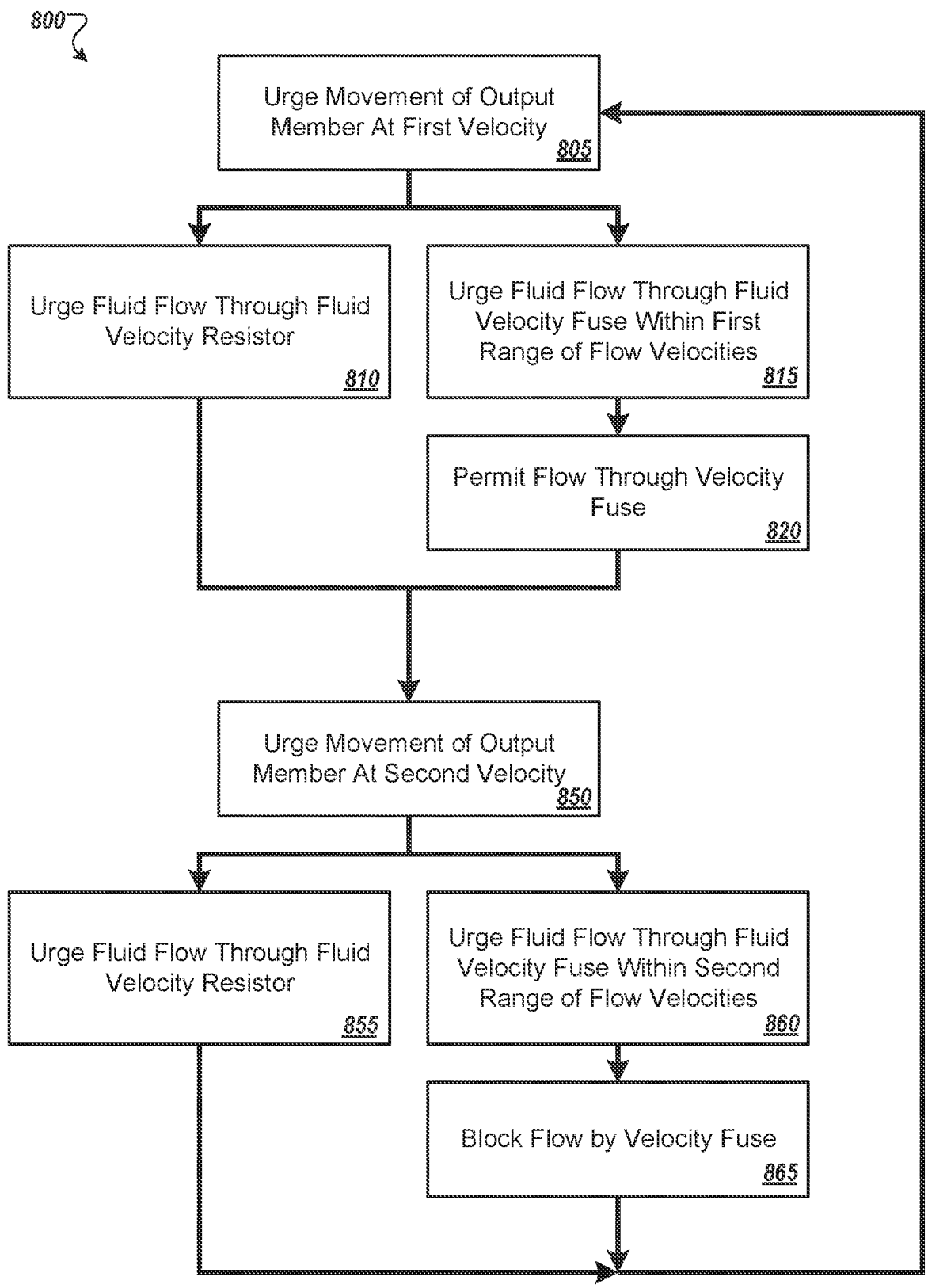
FIG. 8 is a flow diagram of an example process for thrust reverser system velocity control.

FIG. 8 is a flow diagram of an example process 800 for thrust reverser system velocity control. In some implementations, the example process can be performed by parts or all of one or more of the an example turbofan jet engine assembly 10 of FIGS. 1-3, the example thrust reverser 20, the example thrust reverser 30, the example TRAS 400 of FIGS. 4A-4B, the example TRAS 500 of FIG. 5, the example TRAS 600 of FIG. 6, the example TRAS 700 of FIG. 7A, and the example thrust reverser velocity controller 705 of FIGS. 7B and 7C for controlling actuator velocity.

At 805, movement of an output member of an actuator at a first output member velocity is urged. For example, the example output member 430 can be extended at a first velocity based on power provided by the motor 412.

At 810, fluid flow is urged, by a fluid actuator assembly and based on movement of the output member at the first output member velocity, at a first fluid flow velocity through a fluid velocity resistor configured to provide a predetermined resistance to fluid flow. For example, movement of the example output member 430 urges actuation of the fluid piston assembly 440, which causes a fluid flow out the fluid port 450 at a fluid velocity that is proportional to the linear velocity of the output member 430, and a portion of that flow flows though the fluid velocity resistor 470.

At 815, fluid flow is urged, by the fluid actuator assembly and based on movement of the output member at the first output member velocity, at a second fluid flow velocity through a fluid velocity fuse configured to flow fluid flows having a first predetermined range of fluid velocities and to block fluid flows having second predetermined range of fluid velocities, where the second fluid flow velocity is within the first predetermined range of fluid velocities. For example, movement of the example output member 430 urges actuation of the fluid piston assembly 441, which causes a fluid flow out the fluid port 450 at a fluid velocity that is proportional to the linear velocity of the output member 430, and a portion of that flow flows to the fluid velocity fuse 480.

At 820, the fluid velocity fuse permits fluid flow through the fluid velocity fuse based on the second fluid flow velocity being within the first predetermined range of fluid velocities. For example, the portion of the flow that flows though the example fluid velocity fuse 480 can continue as long as that portion flows at a velocity that is not high enough to trip the fluid velocity fuse 480.

At 850, movement of the output member of the actuator at a second output member velocity is urged, and the second output member velocity is different from the first output member velocity. For example, the example output member 430 can be extended at a second (e.g., higher) velocity based on power provided by the motor 412 plus aiding forces that act upon the thrust reverser to draw the output member 430 into extension faster than the rate that would be caused by the motor 412 alone.

At 855, fluid flow is urged, by the fluid actuator assembly and based on movement of the output member at the second output member velocity, at a third fluid flow velocity through the fluid velocity resistor configured to provide the predetermined resistance to fluid flow. For example, movement of the example output member 430 urges actuation of the fluid piston assembly 441, which causes a fluid flow out the fluid port 450 at a fluid velocity that is proportional to the linear velocity of the output member 430, and a portion of that flow flows though the fluid velocity resistor 470.

At 860, fluid flow is urged, by the fluid actuator assembly and based on movement of the output member at the second output member velocity, at a fourth fluid flow velocity through the fluid velocity fuse configured to flow fluid flows having a first predetermined range of fluid velocities and to block fluid flows having second predetermined range of fluid velocities. The fourth fluid flow velocity is different from the second fluid flow velocity, and the fourth fluid flow velocity is within the second predetermined range of fluid velocities. For example, movement of the example output member 430 urges actuation of the fluid piston assembly 440, which causes a fluid flow out the fluid port 450 at a fluid velocity that is proportional to the linear velocity of the output member 430, and a portion of that flow is in fluid communication with the fluid velocity fuse 480.

At 865, the fluid velocity fuse blocks fluid flow through the fluid velocity fuse based on the fourth fluid flow velocity being within the second predetermined range of fluid velocities. For example, when the velocity of fluid flowing through the example fluid velocity fuse 480 exceeds a predetermined rating of the fluid velocity fuse 480, the fluid velocity fuse 480 will close and block further fluid flow through the fluid velocity fuse 480. Under such conditions, substantially all of the flow is directed through the fluid velocity resistor 470.

In some implementations, the process 800 can include resisting movement of the output member at a first level of resistance based on the first fluid flow velocity and the second fluid flow velocity, and resisting movement of the output member at a second level of resistance based on the third fluid flow velocity and the blocking of fluid flow by the fluid velocity fuse. For example, when the example output member 430 is moving slowly, part of the fluid flow can pass through the fluid velocity fuse 480 in parallel with the flow passing through the fluid velocity resistor, but when the output member 430 is moving quickly enough, the fluid velocity fuse 480 will close and cause additional resistance to the flow and the mechanical forces that cause the flow.

In some implementations, the fluid velocity resistor can be connected in fluidic parallel with the fluid velocity fuse. For example, the example fluid velocity resistor 470 is connected in fluidic parallel with the fluid velocity fuse 480.

In some implementations, the fluid actuator assembly of the process 800 can include a fluid piston assembly having a pressure chamber defined by a source fluid reservoir and a piston configured to vary a volume of the pressure chamber based on actuation of the output member. In some implementations, urging fluid flow at the first fluid flow velocity through the fluid velocity resistor can include reducing the volume of the pressure chamber, based on movement of the output member at the first output member velocity and urging fluid flow out of the pressure chamber at a first outflow rate. In some implementations, the urging can include urging, by the fluid actuator assembly, based on movement of the output member at the second output member velocity, fluid flow at the fourth fluid flow velocity through the fluid velocity fuse. In some implementations, the fourth fluid flow velocity can be different from the second fluid flow velocity. In some implementations, the fourth fluid flow velocity being within the second predetermined range of fluid velocities can include reducing the volume of the pressure chamber, based on movement of the output member at the second output member velocity and urging fluid flow out of the pressure chamber at a second outflow rate that is different from the first outflow rate. For example, the example piston 444 can vary the volume of the pressure chamber 442 based on actuation of the output member 430. In another example, the piston 544 can move to vary a volume of the pressure chamber 542.

The process 800 can also include urging fluid flow to a drain fluid reservoir, wherein the fluid velocity resistor and the fluid velocity fuse are connected in fluidic parallel between the pressure chamber and the drain fluid reservoir, and the piston assembly is configured to urge fluid flow from the pressure chamber to the drain fluid reservoir through the fluid velocity resistor and the fluid velocity fuse. For example, the example source fluid reservoir 434 can be in fluid communication with the example drain fluid reservoir 460 through the fluid velocity resistor 470 and the fluid velocity fuse 480.

The process 800 can also include urging, by a fluid pressure assembly of the pressure chamber, fluid flow from the drain fluid reservoir to the source fluid reservoir. In some implementations, the process 800 can include energizing an energy storage member based on fluid flow to the drain fluid reservoir, and wherein urging, by the fluid pressure assembly of the pressure chamber, fluid flow from the drain fluid reservoir to the source fluid reservoir comprises urge fluid flow toward the fluid actuator based on energy recovered from the energy storage member. For example, the example piston 466 can be configured to energize the energy storage member 468 in response to receiving fluid from the fluid actuator assembly 440, and can urge fluid flow toward the fluid actuator assembly 440 based on energy recovered from the energy storage member 468.

In some implementations, the process 800 can include pumping, by a fluid pump assembly of the fluid actuator assembly and configured to be driven by the output member, fluid at a first pump output velocity based on movement of the output member at the first output member velocity, wherein the first fluid flow velocity and the second fluid flow velocity are based on the first pump output velocity, pumping, by the fluid pump assembly, fluid at a second pump output velocity different from the first pump output velocity based on movement of the output member at the second output member velocity, wherein the third fluid flow velocity and the fourth fluid flow velocity are based on the second pump output velocity. For example, the example fluid velocity controller 701a and/or the example fluid velocity controller 701b can be driven by motion of the output member 430 to pump fluid through one or both of the fluid velocity resistor 470 and the fluid velocity fuse 480.

In some implementations, the process 800 can include urging, by a pump member of the fluid pump assembly, fluid from a first fluid port in fluidic communication with a first side of the fluid velocity resistor and a first side of the fluid velocity fuse, to a second fluid port in fluidic communication with a second side of the fluid velocity resistor and a second side of the fluid velocity fuse, urging, by the pump member, fluid flow from the second fluid port to the first fluid port through the fluid velocity resistor and the fluid velocity fuse. For example, the example fluid pump assembly 750 of FIGS. 7B and 7C includes the fluid port 751 in fluidic communication with the fluid port 760. As such, the fluid port 751 is in fluid communication with the first side 770a of the fluid velocity resistor 470 and the first side 770b of the fluid velocity fuse 480. The fluid pump assembly 750 also includes the fluid port 752 in fluidic communication with the fluid port 762. As such, the fluid port 752 is in fluid communication with the second side 772a of the fluid velocity resistor 470 and the second side 772b of the fluid velocity fuse 480. The fluid pump assembly 750 is configured to urge fluid flow from the fluid port 751 to the fluid port 752, and to urge fluid flow from the fluid port 752 to the fluid port 751 through the fluid velocity resistor 470 and the fluid velocity fuse 480.

In some implementations, the process 800 can include applying electric power to an electromechanical actuator configured to urge movement of the output member. For example, electric power can be applied to the motor 412 to drive extension and/or retraction of the output member 430.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of controlling actuator velocity, the method comprising:
    urging movement of an output member mechanically linked to an electromechanical actuator at a first output member velocity;
    urging, by a fluid actuator assembly, based on movement of the output member at the first output member velocity, fluid flow at a first fluid flow velocity through a fluid velocity resistor configured to provide a predetermined resistance to fluid flow;
    urging, by the fluid actuator assembly, based on movement of the output member at the first output member velocity, fluid flow at a second fluid flow velocity through a fluid velocity fuse configured to flow fluid flows having a first predetermined range of fluid velocities at or below a predetermined fluid velocity threshold in a first direction and to block fluid flows having second predetermined range of fluid velocities above the predetermined fluid velocity threshold in the first direction, wherein the second fluid flow velocity is within the first predetermined range of fluid velocities;
    permitting, by the fluid velocity fuse, fluid flow through the fluid velocity fuse based on the second fluid flow velocity being within the first predetermined range of fluid velocities;
    urging movement of the output member at a second output member velocity, different from the first output member velocity;
    urging, by the fluid actuator assembly, based on movement of the output member at the second output member velocity, fluid flow at a third fluid flow velocity through the fluid velocity resistor; and
    urging, by the fluid actuator assembly, based on movement of the output member at the second output member velocity, fluid flow at a fourth fluid flow velocity through the fluid velocity fuse, wherein the fourth fluid flow velocity is different from the second fluid flow velocity, and wherein the fourth fluid flow velocity is within the second predetermined range of fluid velocities; and
    blocking, by the fluid velocity fuse, fluid flow through the fluid velocity fuse based on the fourth fluid flow velocity being within the second predetermined range of fluid velocities.

2. The method of claim 1, further comprising:
    resisting movement of the output member at a first level of resistance based on the first fluid flow velocity and the second fluid flow velocity; and resisting movement of the output member at a second level of resistance based on the third fluid flow velocity and based on the blocking of fluid flow by the fluid velocity fuse.

3. The method of claim 1, wherein the fluid velocity resistor is connected in fluidic parallel with the fluid velocity fuse.

4. The method of claim 1, wherein:
the fluid actuator assembly comprises a fluid piston assembly comprising a pressure chamber defined by a source fluid reservoir and a piston configured to vary a volume of the pressure chamber based on actuation of the output member;
urging, by the fluid actuator assembly, based on movement of the output member at the first output member velocity, fluid flow at the first fluid flow velocity through the fluid velocity resistor configured to provide the predetermined resistance to fluid flow further comprises reducing the volume of the pressure chamber, based on movement of the output member at the first output member velocity and urging fluid flow out of the pressure chamber at a first outflow rate; and
urging, by the fluid actuator assembly, based on movement of the output member at the second output member velocity, fluid flow at the fourth fluid flow velocity through the fluid velocity fuse, wherein the fourth fluid flow velocity is different from the second fluid flow velocity, and wherein the fourth fluid flow velocity is within the second predetermined range of fluid velocities further comprises reducing the volume of the pressure chamber, based on movement of the output member at the second output member velocity and urging fluid flow out of the pressure chamber at a second outflow rate that is different from the first outflow rate.

5. The method of claim 4, further comprising urging fluid flow to a drain fluid reservoir, wherein the fluid velocity resistor and the fluid velocity fuse are connected in fluidic parallel between the pressure chamber and the drain fluid reservoir, and the fluid piston assembly is configured to urge fluid flow from the pressure chamber to the drain fluid reservoir through the fluid velocity resistor and the fluid velocity fuse.

6. The method of claim 5, further comprising urging, by a fluid pressure assembly, fluid flow from the drain fluid reservoir to the source fluid reservoir.

7. The method of claim 6, further comprising energizing an energy storage member based on fluid flow to the drain fluid reservoir, and wherein urging, by the fluid pressure assembly, fluid flow from the drain fluid reservoir to the source fluid reservoir comprises urge fluid flow toward the fluid actuator assembly based on energy recovered from the energy storage member.

8. The method of claim 1, further comprising:
pumping, by a fluid pump assembly of the fluid actuator assembly and configured to be driven by the output member, fluid at a first pump output velocity based on movement of the output member at the first output member velocity, wherein the first fluid flow velocity and the second fluid flow velocity are based on the first pump output velocity; and
pumping, by the fluid pump assembly, fluid at a second pump output velocity different from the first pump output velocity based on movement of the output member at the second output member velocity, wherein the third fluid flow velocity and the fourth fluid flow velocity are based on the second pump output velocity.

9. The method of claim 8, further comprising:
urging, by a pump member of the fluid pump assembly, fluid from a first fluid port in fluidic communication with a first side of the fluid velocity resistor and a first side of the fluid velocity fuse, to a second fluid port in fluidic communication with a second side of the fluid velocity resistor and a second side of the fluid velocity fuse; and
urging, by the pump member, fluid flow from the second fluid port to the first fluid port through the fluid velocity resistor and the fluid velocity fuse.

10. The method of claim 1, further comprising applying electric power to the electromechanical actuator, wherein the electromechanical actuator is an electromechanical actuator configured to urge movement of the output member.

* * * * *

UNITED STATES PATENT AND TRADEMARK OFFICE
CERTIFICATE OF CORRECTION

PATENT NO. : 12,180,909 B2  
APPLICATION NO. : 18/314322  
DATED : December 31, 2024  
INVENTOR(S) : Joseph Thomas Kopecek and William Muster Page 1 of 1

It is certified that error appears in the above-identified patent and that said Letters Patent is hereby corrected as shown below:

In the Specification

Column 1, Line 7 (Approx.), please delete "Oct. 20," and insert therefore -- Oct. 12, --.

Signed and Sealed this  
Eighth Day of April, 2025

Coke Morgan Stewart  
*Acting Director of the United States Patent and Trademark Office*